United States Patent
Okajima et al.

(10) Patent No.: US 7,082,086 B2
(45) Date of Patent: Jul. 25, 2006

(54) DISC APPARATUS

(75) Inventors: Tadashi Okajima, Osaka (JP);
Shigekazu Minechika, Osaka (JP);
Takanobu Hisamitsu, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 213 days.

(21) Appl. No.: 10/497,171

(22) PCT Filed: Dec. 5, 2002

(86) PCT No.: PCT/JP02/12801

§ 371 (c)(1),
(2), (4) Date: Jun. 9, 2004

(87) PCT Pub. No.: WO03/050807

PCT Pub. Date: Jun. 19, 2003

(65) Prior Publication Data

US 2005/0174905 A1 Aug. 11, 2005

(30) Foreign Application Priority Data

Dec. 10, 2001 (JP) ............................. 2001-375220

(51) Int. Cl.
*G11B 7/00* (2006.01)

(52) U.S. Cl. .............................. 369/47.38; 369/47.42; 369/47.45

(58) Field of Classification Search ............... 369/47.1, 369/47.22, 47.23, 47.28, 47.3, 47.38, 47.42, 369/47.45

See application file for complete search history.

(56) References Cited

U.S. PATENT DOCUMENTS 6,236,629 B1 * 5/2001 Hisakado et al. ......... 369/47.32

FOREIGN PATENT DOCUMENTS

| JP | 61-177639 | 8/1986 |
| JP | 8-106739 | 4/1996 |
| JP | 2001-52373 | 2/2001 |

* cited by examiner

*Primary Examiner*—Nabil Hindi
(74) *Attorney, Agent, or Firm*—Armstrong, Kratz, Quintos, Hanson & Brooks, LLP

(57) ABSTRACT

A disk apparatus (10) includes an optical pick-up (12) and a DSP (28), and irradiates a laser beam onto a recording surface of a disk recording medium (100) by the optical pick-up. In a case that a time period (access time period) required for a seek is shorter than a time period (changing time period) required for the number of rotations, the DSP does not simultaneously perform a change of the number of rotations and the seek. To the contrary, the DSP delays the seek by |access time period−changing time period|, and performs a recording and a reproduction after the change of the number of rotation is ended.

3 Claims, 6 Drawing Sheets

US 7,082,086 B2

DISC APPARATUS

TECHNICAL FIELD

The present invention relates to a disk apparatus and a disk access method. More specifically, the present invention relates to a disk apparatus and a disk access method that rotate by a motor a disk recording medium in which a plurality of areas having optimum rotating speeds different to each other are allotted to a recording surface, and radiate by an optical pick-up a laser beam onto any one of the plurality of areas.

PRIOR ART

A disk 10 used in a conventional kind of a disk apparatus and an access method is formed with a track in a spiral manner as shown in FIG. 3. This track is formed of a plurality of zones 100a having the disk 100 divided in a radial direction. The number of sectors 100b included in one track (in a colloquial sense that donates one circumference. Hereinafter, the same is true.) is the same in the same zone 100a. In addition, the outer the zone 100a on an outer circumferential side, the more sectors 100b included in one track.

In the conventional kind of the disk apparatus, in order to render a recording density of each sector 100b equal, the disk 100 is made to rotate in a ZCLV (Zone Constant Linear Velocity) system. Therefore, the maximum rotating speed of the disk 100 is the same in the same zone as shown in FIG. 4(A), and the rotating speed gradually becomes slowly in proportion to a distance from the inner circumferential side to the outer circumferential side.

In a case of managing a file by an FAT (File Allocation Table) system or a UDF (Universal Disk Format) system, the sector 100b of an access destination strides over the zone, and at this time, it is needed to change the rotating speed of the disk 100, that is, to change the rotating speed of a spindle motor. In addition, the further the zone 100a to each other (the longer a distance of the seek), the larger a difference of the rotating speed between before and after the change, and thus, a time period for changing the rotating speed becomes longer by that difference.

Furthermore, as a conventional disk apparatus, disclosed in Japanese Patent Laying-open No. 11-66726 [G11B 19/28 7/00 19/247 20/10] laid-open on Mar. 9, 2000, is a disk apparatus using a ZCLV system for rotating the disk at a time of recording a signal, and using a ZCAV (Zone Constant Angular Velocity) system for rotating the disk 100 in order to increase the speed of a process at a time of reproducing the signal. As shown in FIG. 4(B), the rotating speed is approximately constant by the ZCAV system irrespective of the zone. Thus, in such the disk apparatus, on one hand, the time period required for the seek is negligible when the process is switched from the recording to the reproducing in the zone on the outer circumferential side. On the other hand, the time period required for changing the rotating speed becomes long.

When the time period required for changing the rotating speed becomes long, a following problem occurs. When it is intended to read out a signal (file) from the plurality of sectors 100b formed in the zones 100a different to each other, the sector 100b on the outer circumference is accessed (reproduced (2)) after accessing (reproducing (1)) the sector 100b on the inner circumference, it is needed to increase the rotating speed of the disk 100 as shown in FIG. 5.

As shown in FIG. 5, in a case that the time period (hereinafter referred to as a "changing time period" or a "second time period") required for changing this rotation speed is longer than the time period (hereinafter referred to as a "seek time period" or a "first time period") required for the seek, the seek is ended before the changing of the rotating speed is completed, and a reproduction (2) is executed. At this time, the rotating speed does not reach an intended rotating speed so that the reproduction (2) is unsuccessful, and then, the reproduction is re-tried. In total, there are twelve kinds of check items for retrying such as an excess or deficiency of the laser power, a deviance of a phase of data, and etc. There are the twelve items so that it is needed to retry up to a maximum of twelve times. This leads to a problem that a process of the reproduction (2) becomes slow by these 12 times.

SUMMARY OF THE INVENTION

Therefore, it is a primary object of the present invention to provide a novel disk apparatus and disk access method.

It is another object of the present invention to provide a disk apparatus and a disk access method capable of improving a disk access characteristic.

A first invention is a disk apparatus that rotates by a motor a disk recording medium in which a plurality of areas having optimum rotating speeds different to each other are allotted to a recording surface, and irradiates by an optical pick-up a laser beam to any one of the plurality of areas, and comprises: a mover for moving, when a current area to which the laser beam is irradiated at this time and a desired area to which the laser beam is intended to be irradiated do not agree, the optical pick-up to a location corresponding to the desired area; a changer for changing, when the current area and the desired area do not agree, a rotating speed of the motor to the optimum rotating speed of the desired area; and a delayer for delaying when a first time period required for moving the optical pick-up by the mover is shorter than a second time period required for changing the rotating speed by the changer, a start of moving the optical pick-up by the mover by a delayed time period that corresponds to a difference between the first time period and the second time period.

A second invention is a disk access method that rotates by a motor a disk recording medium in which a plurality of areas having optimum rotating speeds different to each other are allotted to a recording surface, and irradiates by an optical pick-up a laser beam to any one of the plurality of areas, and comprises following steps of: (a) moving, when a current area to which the laser beam is irradiated at this time and a desired area to which the laser beam is intended to be irradiated do not agree, the optical pick-up to a location corresponding to the desired area; (b) changing, when the current area and the desired area do not agree, a rotating speed of the motor to the optimum rotating speed of the desired area; and (c) delaying, when a first time period required for moving the optical pick-up in the step (a) is shorter than a second time period required for changing the rotating speed in the step (b), a start of moving the optical pick-up in the step (a) by a delayed time period that corresponds to a difference between the first time period and the second time period.

In the present invention, in a disk apparatus that rotates by a motor a disk recording medium in which a plurality of areas having optimum rotating speeds different to each other are allotted to a recording surface, and irradiates by an optical pick-up a laser beam to any one of the plurality of areas, in a case that a moving time period of the optical pick-up to a desired area to which the laser beam is irradiated is shorter than a time period until the optimum rotating speed of the desired area is reached, a start of moving the optical pick-up is delayed, and the laser beam is irradiated to the desired area after the optimum rotating speed is reached.

That is, when a current area to which the laser beam is irradiated at this time and a desired area to which the laser beam is intended to be irradiated do not agree, the mover moves the optical pick-up to a location corresponding to the desired area, and when the current area and the desired area do not agree, the changer changes a rotating speed of the motor to the optimum rotating speed of the desired area.

In addition, when a first time period required for moving the optical pick-up by the mover is shorter than a second time period required for changing the rotating speed by the changer, a start of moving the optical pick-up by the mover is delayed by a difference between the first time period and the second time period.

As a consequence, eliminated is a situation where a writing and a reading into/from the disk recording medium are performed in a state in which the rotating speed is too fast or too slow, and an unsuccessful writing and reading that result from an excess or deficiency of the rotating speed are prevented, thus restraining an occurrence of a re-trial.

According to the present invention, it is possible to shorten a time period required for an operation of the writing and reading into/from the disk recording medium.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 4(A) is an illustrative view showing the rotating speed by a ZCLV system, and FIG. 4(B) is an illustrative view showing the rotating speed by a ZCAV system;

FIG. 6(A) is an illustrative view showing a timing of the conventional disk apparatus, and FIG. 6(B) is an illustrative view showing the timing of the disk apparatus of the FIG. 1 embodiment.

BEST MODE FOR PRACTICING THE INVENTION

Figure 1:
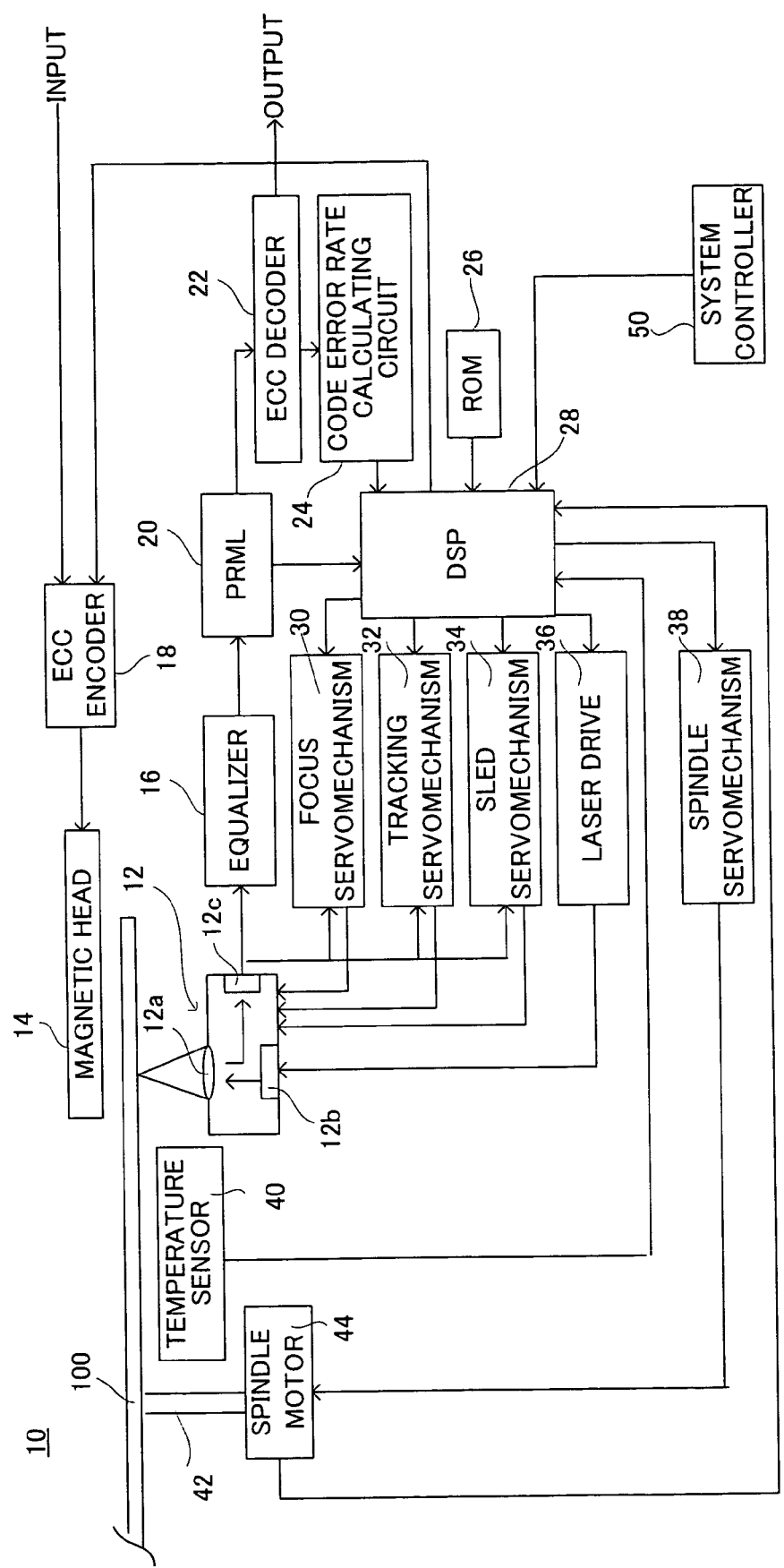
FIG. 1 is a block diagram showing an overview of a disk apparatus.

Referring to FIG. 1, a disk apparatus 10 of this embodiment includes an optical pick-up 12. A location of the optical pick-up 12 in a radius direction of the magnetooptical disk 10 is controlled by a sled servomechanism 34. In addition, a location of an optical lens 12a provided in the optical pick-up 12 in an optical axis direction is controlled by a focus servomechanism 30. Furthermore, a location of the optical lens 12a in a radius direction of the magnetooptical disk 100 is controlled by a tracking servomechanism 32.

In a laser drive 36, a laser power value is set by a control signal applied from a DSP 28, and the laser drive 36 allows a laser beam of the set laser power value to be output from a laser diode 12b. The laser beam output from the laser diode 12b is converged by the optical lens 12a, and irradiated onto a recording surface of the magnetooptical disk 100.

The magnetooptical disk 100 includes a reproducing layer and a recording layer, and a desired signal is recorded in the recording layer. When the desired signal is recorded in the recording layer, the laser beam is irradiated onto the recording layer via the optical lens 12a focused on the recording layer and the reproducing layer. When a magnetic field is applied by a magnetic head 14 to the recording layer having a Curie temperature reached by the laser beam, a portion having the Curie temperature reached in the recording layer is magnetized toward a magnetic field direction. Each magnetized portion is referred to as a mark. By controlling the magnetic field produced by the magnetic head 14, the desired signal is recorded in the recording layer of the magnetooptical disk 100.

On the other hand, when the signal is read out from the magnetooptical disk 100, the laser beam is irradiated onto the reproducing layer via the optical lens 12a focused on the reproducing layer. The reproducing layer that has reached a predetermined temperature (temperature lower than the Curie temperature) by a radiation of the laser beam indicates a magnetism, and is magnetized corresponding to the magnetic field retained by the mark in the recording layer. The laser beam reflected in the reproducing layer is deflected corresponding to a direction of the magnetic field of the reproducing layer, and the optical pick-up 12 reads the signal based on a deflecting state of the reflected laser beam.

The recording layer is raised to the Curie temperature so that a recording laser beam needs an output (power) greater than a reproducing laser beam. In addition, the temperature at which the reproducing layer indicates the magnetism is determined in advance. However, an intensity of the laser beam necessary for reaching the temperature differs depending on the temperature of the magnetooptical disk 100. Therefore, besides an optimum recording laser power value, the optimum reproducing laser power value, too, depends on the temperature of the magnetooptical disk 100. It is noted that an ambient temperature of the magnetooptical disk 100 is measured by a temperature sensor 44, and its measurement result is applied to the DSP 28.

When the desired signal is recorded in the magnetooptical disk 100, an ECC encoder 18 attaches an error correcting code (ECC) to an input signal, and renders the signal to which the error correcting code is attached an encode signal. The magnetic head 14 produces the magnetic field corresponding to the encode signal applied from the ECC encoder 18.

Herein, the error correcting code is a code attached to each signal of a predetermined amount, and the signal of the predetermined amount to which the error correcting signal is attached is referred to as an ECC block. The ECC block is constructed of a group of signals that is referred to as a plurality of lines. An ECC decoder 22 described later is capable of automatically correcting an erroneous signal (hereinafter briefly referred to as an "error signal") based on the error correcting code when an error is included in a digital signal within the block. However, a signal amount of a correctable error signal has a predetermined limit.

When the signal recorded in the magnetooptical disk 100 is reproduced, the laser diode 12b is controlled by the laser drive 36, and the laser diode 12b outputs the laser beam corresponding to the control. The output laser beam is irradiated onto a surface of the magnetooptical disk 100 via the optical lens 12a. A reflected light from the surface of the magnetooptical disk 100 permeates through the same optical lens 12a, and is incident onto a light detector 12. The light detector 12c applies a signal (RF signal) corresponding to the incident light to an equalizer 16. The equalizer 16 compensates a frequency characteristic of the RF signal, and applies the same to an RPML (Partial Response Maximum Likelihood) circuit 20. The RPML circuit 20 generates the digital signal based on the RF signal, and applies the generated digital signal to the ECC decoder 22. The ECC decoder 22 applies an error correction to the error signal included in the digital signal received from the PRML circuit 20 by each one ECC block. In addition, the ECC decoder 22 applies to a code error rate calculating circuit 24 information (hereinafter briefly referred to as "correcting amount information") indicating how many error signals are corrected in one line of the ECC block, that is, how many error signals are included in one line. The code error rate calculating circuit 24 calculates a code error rate based on the correction amount information applied from the ECC decoder 22, and applies the same to the DSP 28.

The magnetooptical disk 100 is mounted on a spindle (not shown), and the spindle is coupled to a spindle motor 40 via a shaft 42. The DSP 28 applies the control signal to a spindle servomechanism 38, and the spindle servomechanism 38 rotates the spindle motor 40 based on a received control signal. In conjunction therewith, the shaft 42 is rotated, and the spindle, that is, the magnetooptical disk 100, is rotated. In addition, the spindle motor 40 produces an FG signal correlated with a rotating speed of the spindle, and applies this FG signal to the DSP 28. As a result of the DSP 28 monitoring this FG signal, the spindle coupled to the shaft 42, that is, the rotating speed of the magnetooptical disk 100 is appropriately controlled. This control allows the magnetooptical disk 100 to be rotated by the ZCLV system at a time of recording the signal, and rotated by the ZCAV system at a time of reproducing the signal.

As described above, by the ZCLV system, if a zone 100a to which a sector 100b onto which the laser beam is irradiated belongs differs, the rotating speed of the magnetooptical disk 100 is changed. In addition, if a switch is made between the recording and the reproducing, a disk rotating method is switched between the ZCLV system and the ZCAV system so that the rotating speed of the magnetooptical disk 100 is changed.

Figure 4:
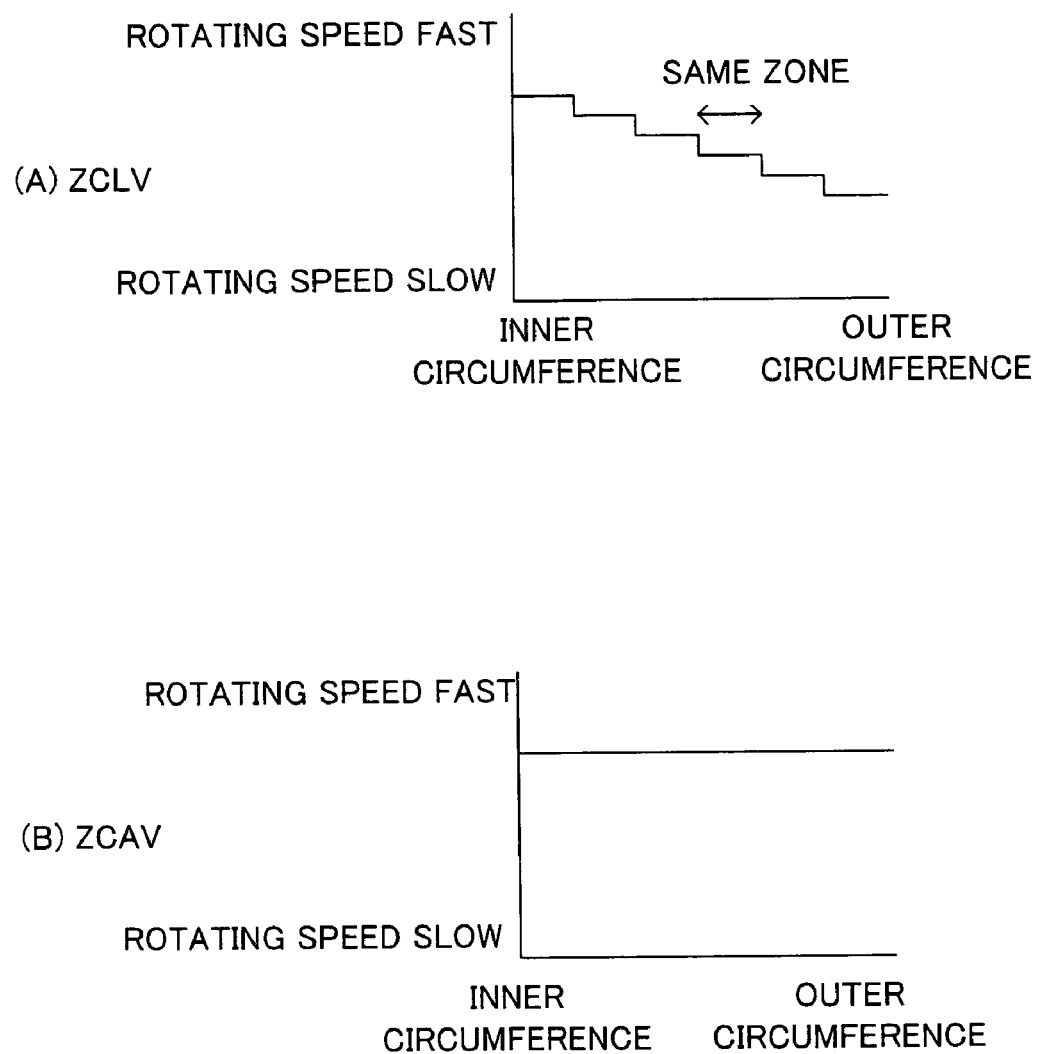
FIG. 4 is an illustrative view showing as a model a difference of a rotating speed of the magnetooptical disk.
Figure 5:
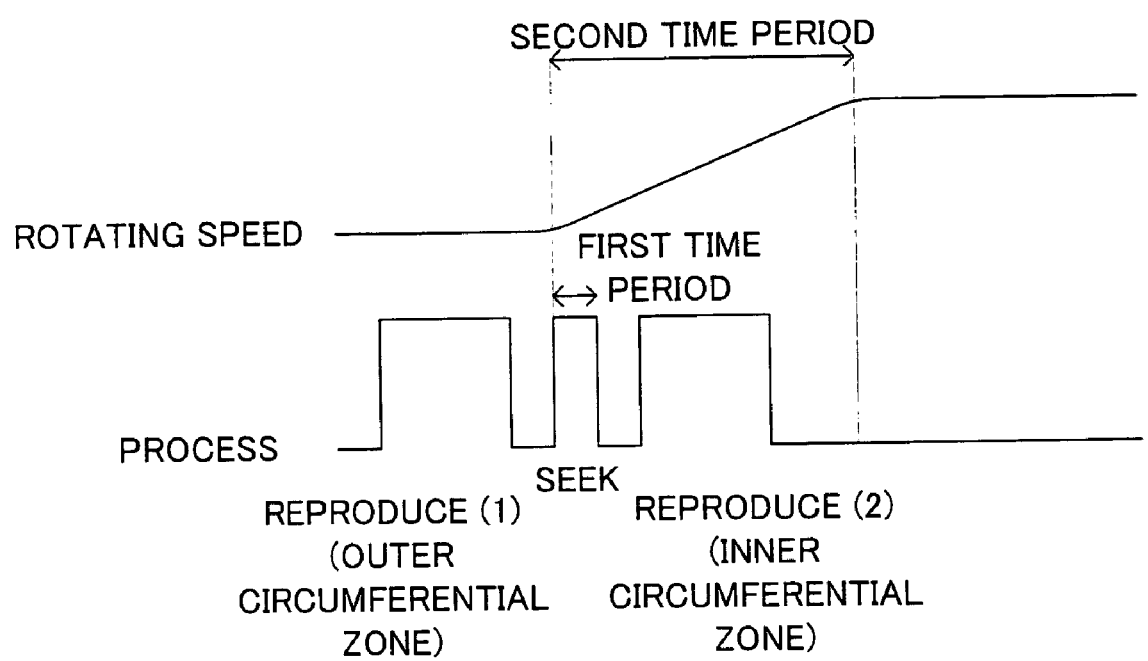
FIG. 5 is an illustrative view showing a change of the rotating speed and a processing timing of the magnetooptical disk in a conventional disk apparatus.

A time period required for changing this rotating speed is maximum when the recording/reproducing is switched for performing verifying after the recording, for example, in an outermost circumference of the magnetooptical disk 100 as understood from FIGS. 4(A) and (B). At this time, a time period (seek time period: a first time period) for moving the optical pick-up 12 is an almost negligible time period. In contrary, it takes approximately 300 ms for changing the rotating speed (changing from approximately 2000 rpm to approximately 3000 rpm).

Figure 6:
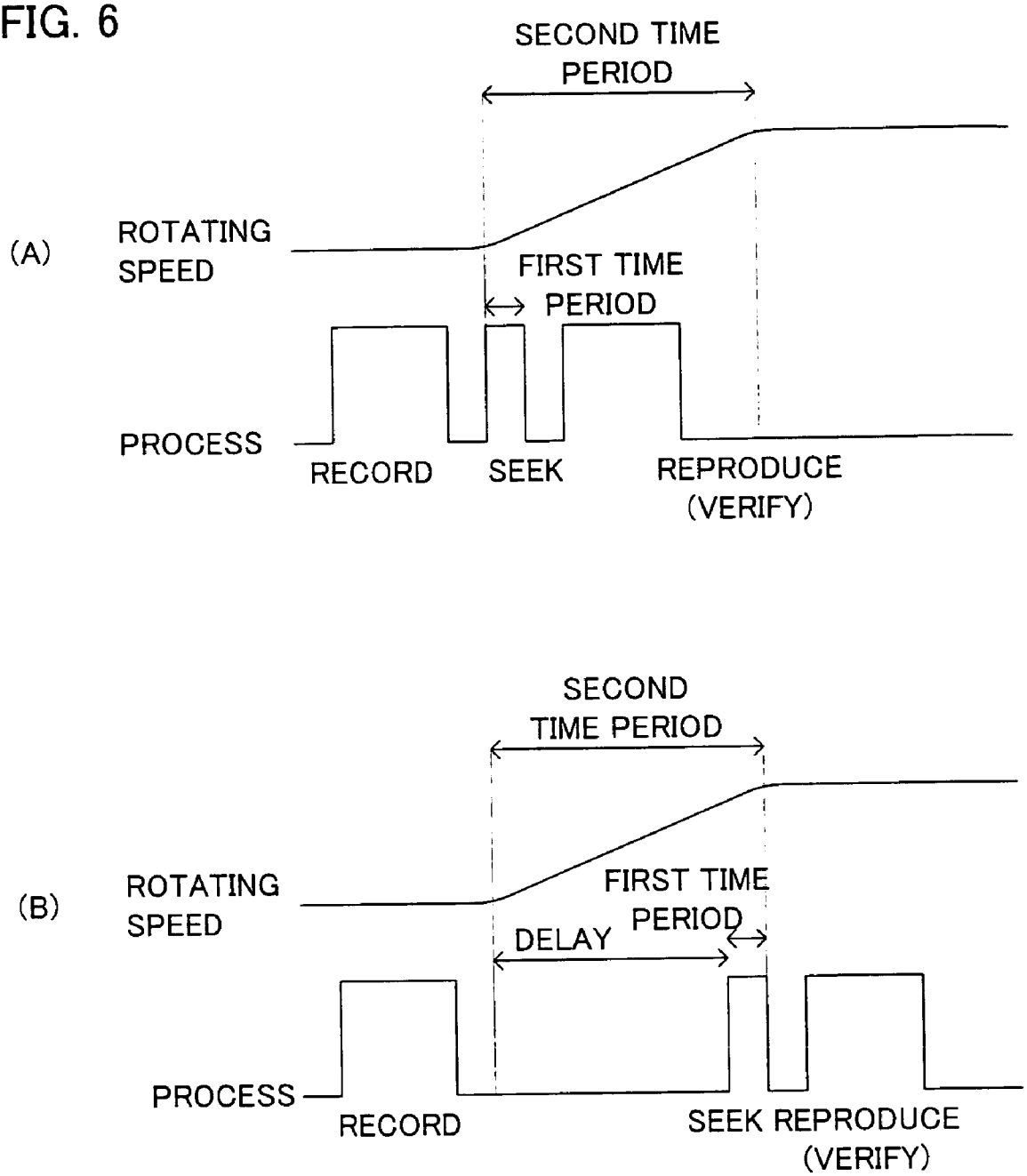
FIG. 6 is an illustrative view showing a change of the rotating speed and a processing timing of the magnetooptical disk.

In this case, as shown in FIG. 6(A), if the seek and the reproducing (verifying) are performed immediately after the recording, the reproducing is performed in a state that the intended rotating speed is not satisfied. As a consequence, the reproduction is not properly performed, and therefore, the reproduction is retried by changing a power value, a phase of the data, and etc. When the reproducing is performed besides the retrial, the seek is performed before two tracks of a desired track, and then, the reproduction is prepared. Thereafter, the reading is performed from the desired track. A most portion of the time period required for the retrial is a time period required for tracing these two tracks.

That is, if the rotating speed is 2500 rpm, one retrial takes approximately 50 ms according to Equation (1). In total, there are 12 kinds of items to be confirmed regarding the retrial such as an excess or deficiency of the laser power, a deviance of the phase of the data, and etc. Therefore, if the retrial is made for each of all the 12 kinds of items, it is understood that it takes a maximum of approximately 600 ms of more time period than Equation (2) (that is, 12 tracing time periods of the two tracks).

$$2 \times 60/2500 = 48 \quad (1)$$

$$50 \times 12 = 600 \quad (2)$$

The DSP of the disk apparatus 10 receives an instruction of a system controller 50 (see FIG. 1) of a host so as to perform operations such as record, reproduce, retry, and so forth. Herein, the host corresponds to a CPU of a personal computer if the disk apparatus 10 is a drive apparatus of the personal computer, and corresponds to a CPU of a digital camera if the disk apparatus 10 is the drive apparatus of the digital camera.

In a case that the reproducing is performed in a state that the intended rotating speed is not satisfied so that it is not capable of reading, a command of the retrial is transmitted from the system controller 50 of the host so as to perform the retrial. In this retrial, despite a fact that the rotating speed is the cause, the reproducing is performed by changing the laser power value as described above, and changing the phase of the data. The rotating speed is the cause, and therefore, even if the razor power is changed, and the phase of the data is changed, the retrial is not successful (in the items to be confirmed regarding the retrial, a confirmation of the rotating speed is not included). Even if the intended rotating speed is reached in the course of the retrial, which defines 12 retrials as one set, the laser power value and the phase of the data have been changed so that the retrial will not succeed. Therefore, even if the intended rotating speed is reached, it will not be successful to verify (reproduce) until the system controller 50 of the host once again issues a read command after the retrial, which defines 12 retrials as one set, is completed. That is, in the conventional disk apparatus, even if the intended rotating speed is reached, the retrial is not successful for as long as a maximum of approximately 600 ms. This produces a wasteful time period, and thus, a reproducing operation is delayed.

In order not to produce such the wasteful time period, the retrial as a result of the excess or deficiency of the rotating speed may not be produced. Consequently, in the disk apparatus 10 of this embodiment, in order to prevent the retrial resulting from the excess or deficiency of the rotating speed from occurring, in a case that the time period (access time period: first time period) for allowing the optical pick up 12 to seek is shorter than the time period (second time period) required for changing the rotating speed to the intended rotating speed, as shown in FIG. 6(B), the time period for starting the seek is made to be delayed by a time period of a difference between the first time period and the second time period. In addition, the reproducing (or recording) is started only after the intended rotating speed (optimum rotating speed) is reached.

Figure 2:
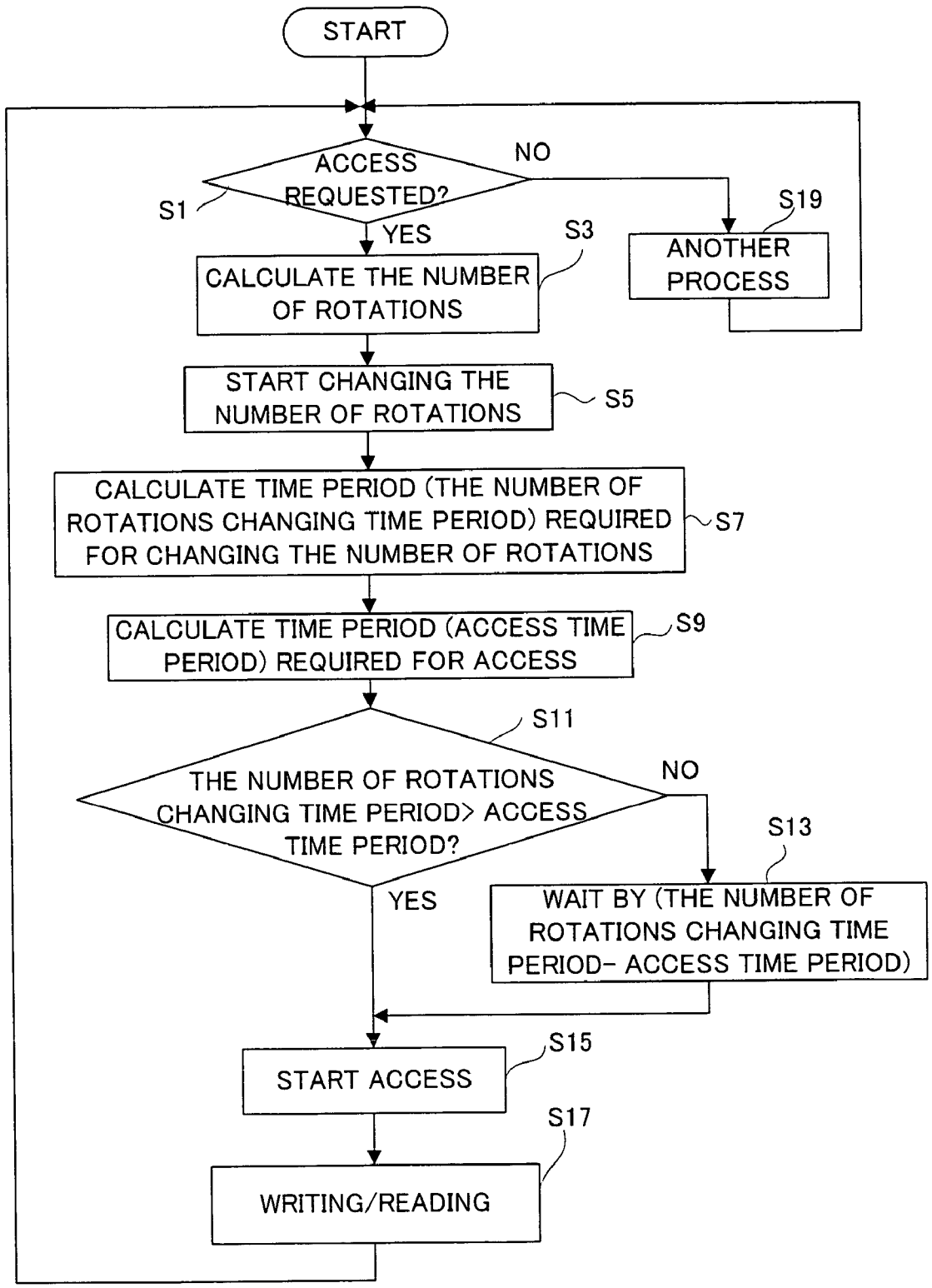
FIG. 2 is a flowchart showing an operation of a FIG. 1 embodiment.
Figure 3:
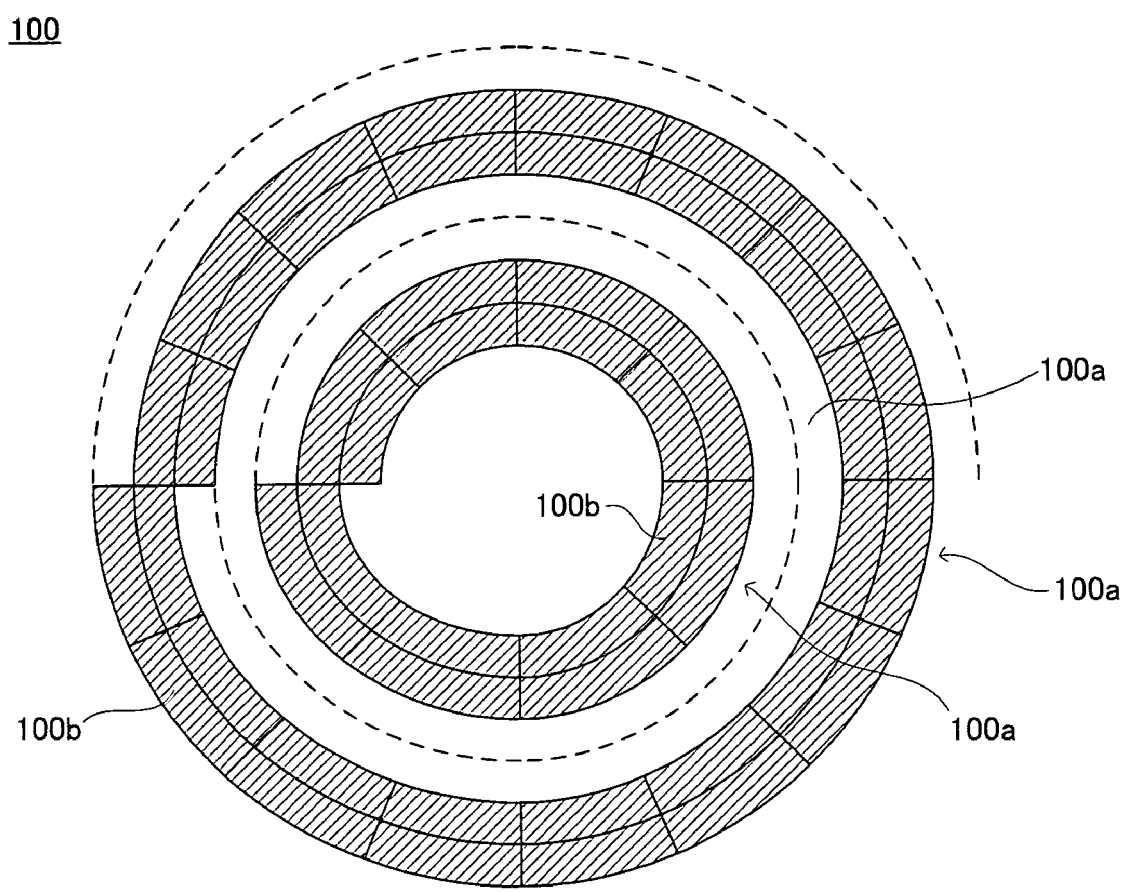
FIG. 3 is an illustrative view showing a magnetooptical disk.

Below is a description regarding an operation of the DSP 28 of the disk apparatus 10 of this embodiment using a flowchart in FIG. 2. It is noted that FIG. 2 only shows a process of an access request to the magnetooptical disk 100.

First, if there is a reproducing request such as the verifying after the writing into the magnetooptical disk 100, it is determined that this is the access request in a step S1. In a case of not being the access request, another process is executed in a step S19.

If it is determined that this is the access request is determined, the optimum rotating speed of the zone 100a in which the sector of an access destination is included is calculated in a step S3. At this time, it is determined whether it is the access for the writing or the access for the reading, and in a case of the access for the writing, it is further determined in which zone 100a the writing is performed, and then, the optimum rotating speed is determined.

When the optimum rotating speed is determined, the DSP 28 applies the control signal to the spindle servomechanism so as to start changing the rotating speed of a stepping motor in a step S5.

In addition, in a step S7, the time period (hereinafter referred to as a "rotating speed changing time period: Tr") required for changing the rotating speed is calculated according to Equation (3).

$$Tr = (|Rp - Rc|/\Delta R) \times Trio \quad (3)$$

It is noted that:
Rc: intended rotating speed (optimum rotating speed);
Rc: current rotating speed;
$\Delta R$: difference of the rotating speed between an innermost circumference and an outermost circumference; and
Trio: time period required for changing the optimum rotating speed of the innermost circumference to the optimum rotating speed of the outermost circumference.

Subsequently, in a step S9, the time period (hereinafter referred to as an "access time period: Ta") required for accessing an intended address is calculated according to Equation (4).

$$Ta = (|Lp - Lc|/\Delta L) \times Taio \quad (4)$$

It is noted that:
Lp: location of the intended address;
Lc: location of the current address;
$\Delta L$: difference between the location of an innermost circumference address and an outermost circumference address; and
Taio: time period required for accessing the address location of the innermost circumference to the address location of the outermost circumference.

Furthermore, in a step S1, by comparing the rotating speed changing time period Tr and the access time period Ta, it is determined whether or not the access time period Ta is shorter than the rotating speed changing time period Tr. In a case that the access time period Ta is not shorter than the rotating speed changing time period Tr, the access (seek) is started in a step S15, and when the access is completed, the writing or reading of the signal is performed in a step S17.

On the other hand, in a case that the access time period Ta is shorter than the rotating speed changing time period Tr, the process is waited by a difference between the rotating speed changing time period Tr and the access time period Ta in a step S13. In addition, the access (seek) is started in the step S15, later. The magnetooptical disk 100 reaches the intended rotating speed (optimum rotating speed) by the time of completing this seek so that the reading (or writing) is performed in the step S17.

As described above, in the disk apparatus 10 of this embodiment, in a case that the access time period Ta is shorter than the rotating speed changing time period Tr, the access (seek) is delayed by a difference between the rotating speed Tr and the access time period Ta, and the reading or writing is performed only after the seek is completed and the magnetooptical disk 100 reaches the intended rotating speed.

Therefore, the reading or the writing is performed only after the magnetooptical disk 100 reaches the intended rotating speed so that it is possible to prevent the retrial (maximum of 12 reproductions) resulting from the excess or deficiency of the rotating speed, thus shortening an operating time period of the recording or the reproducing.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A disk apparatus that rotates by a motor a disk recording medium in which a plurality of areas having optimum rotating speeds different to each other are allotted to a recording surface, and irradiates by an optical pick-up a laser beam to any one of said plurality of areas, comprising:
    a mover for moving, when a current area to which said laser beam is irradiated at this time and a desired area to which said laser beam is intended to be irradiated do not agree, said optical pick-up to a location corresponding to said desired area;
    a changer for changing, when said current area and said desired area do not agree, a rotating speed of said motor to the optimum rotating speed of said desired area; and
    a delayer for delaying, when a first time period required for moving said optical pick-up by said mover is shorter than a second time period required for changing said rotating speed by said changer, a start of moving said optical pick-up by said mover by a delayed time period that corresponds to a difference between said first time period and said second time period.

2. A disk apparatus according to claim 1, wherein said changer rotates said motor by a ZCLV system at a time of writing into said disk recording medium, and rotates said motor by a ZCAV system at a time of reading out from said recording medium.

3. A disk access method that rotates by a motor a disk recording medium in which a plurality of areas having optimum rotating speeds different to each other are allotted to a recording surface, and irradiates by an optical pick-up a laser beam to any one of said plurality of areas, comprising following steps of:
    (a) moving, when a current area to which said laser beam is irradiated at this time and a desired area to which said laser beam is intended to be irradiated do not agree, said optical pick-up to a location corresponding to said desired area;
    (b) changing, when said current area and said desired area do not agree, a rotating speed of said motor to the optimum rotating speed of said desired area; and
    (c) delaying, when a first time period required for moving said optical pick-up in said step (a) is shorter than a second time period required for changing said rotating speed in said step (b), a start of moving said optical pick-up in said step (a) by a delayed time period that corresponds to a difference between said first time period and said second time period.

* * * * *